S. D. Gilson,
Force Pump.
N° 40,723. Patented Nov. 24, 1863.

Witnesses;
J. W. Coombs
G. W. Reed

Inventor;
S. D. Gilson,
Per Munn & Co
Att'ys.

UNITED STATES PATENT OFFICE.

S. D. GILSON, OF SYRACUSE, ASSIGNOR TO HIMSELF AND JOSEPH HALL, OF ROCHESTER, NEW YORK.

IMPROVEMENT IN FORCE-PUMPS.

Specification forming part of Letters Patent No. 40,723, dated November 24, 1863.

*To all whom it may concern:*

Be it known that I, S. D. GILSON, of Syracuse, in the county of Onondaga and State of New York, have invented a new and useful Improvement in force-pumps for feeding locomotive and other boilers, and for other purposes; and I do hereby declare that the following is a full, clear, and exact description of the same, reference being had to the accompanying drawings, forming part of this specification, in which—

Figure 1:
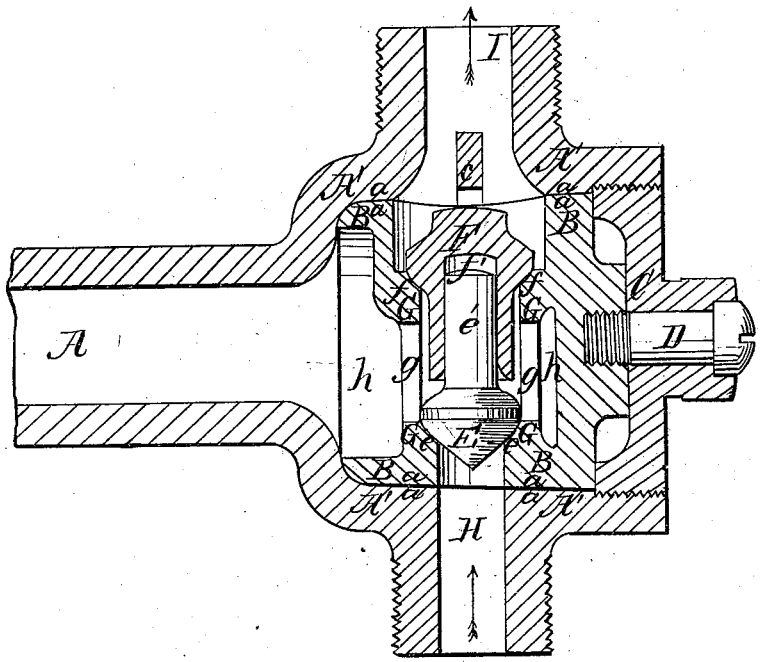
Figure 2:
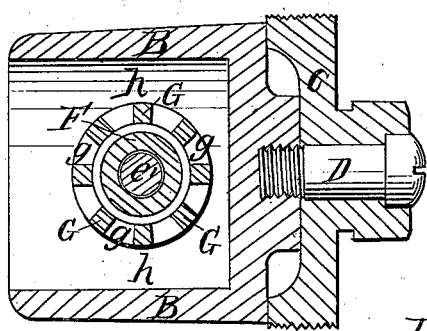

Figure 1 is a central vertical section of the valve-casing, valves, and parts of the barrel and inlet and discharge-pipe connections of a pump, illustrating my invention. Fig. 2 is a horizontal section of the valve-chamber.

Similar letters of reference indicate corresponding parts in both figures.

The principal object of my invention is to provide for the speedy removal and replacement of the valves of a locomotive or other force-pump; and it consists in a certain construction of the valve-casing and mode of applying the same in the pump, and in a certain arrangement of the valves within the casing, whereby the above result is obtained.

To enable others skilled in the art to make and use my invention, I will proceed to describe its construction and operation.

A is the pump-barrel, enlarged at its end in conical form, as shown at A′ A′, for the reception of the valve-casing B, which is inserted in a horizontal direction and made to produce a tight joint, as shown at *a a*, by turning and boring, either with or without grinding.

C is a cap-piece, screwed into or otherwise secured to the mouth of A′ A′, to confine the casing B in place, and having the said casing attached to it by a stout screw-bolt, D, which enables the said casing to be removed with it, but permits the cap-piece to turn without the said casing in screwing the said piece in or out.

The casing B has cast n it, or otherwise secured within it, a cylindrical cage, G, the axis of which intersects the horizontal axis of the casing at right angles, and the said casing so inserted into A′ A′ and secured by a set-screw or other means that the cage occupies a vertical position.

*e* is the seat for the conical induction or vacuum valve E, formed around the lower part of the interior of the cage G below its openings *g g*, which are arranged all around it at equal distances apart. *f* is the seat for the conical eduction or discharge valve F, formed around the top of the cage G. The valves both open upward, and the valve E has its stem *e′* fitted into a cylindrical cavity, *f′*, bored in the valve F, so that each valve forms a guide to the other one, and the valve F forms a stop or guard to the valve E.

*c* is a fixed stop or guard, provided in A′ A′ for the valve F. The induction or suction pipe connection H is formed directly below the valve E, and the eduction or discharge pipe connection I is directly above the valve F.

The operation of the valves is as follows: When, by the action of the pump-plunger, the valve E is opened, the water rushes up into the cage G, and thence through the openings *g g* in the sides of the cage into the surrounding space *h*, within the casing B, and into the barrel, as indicated by black arrows in Fig. 1. When the plunger returns, and the valve E is thereby closed and the valve F is opened, the water passes back through the openings *g g* into the cage and thence up to the discharge-pipe I, as indicated by red arrows in Fig. 1.

What I claim as my invention, and desire to secure by Letters Patent, is—

1. The arrangement of the two valves E F in a cage, G, so that the water is both taken into the pump and discharged therefrom through the said cage, substantially as and for the purpose herein specified.

2. The arrangement of the cage G in a casing, B, which is inserted into and removed from its place in a direction at right angles to the axis of the cage and to the movement of the valves, substantially as herein described.

3. In combination with the arrangement of the two valves and valve-seats in the cage, the fitting of the valves, one within the other, in such manner that each constitutes a guide for the other within the cage, substantially as herein specified.

4. The attachment of the valve-casing to the cap C by a screw-bolt, D, or its equivalent, to allow the said casing to be withdrawn with the cap, substantially as herein set forth.

S. D. GILSON.

Witnesses:
DYER WILLIAMS,
E. P. HASBROUCK.